2,772,945

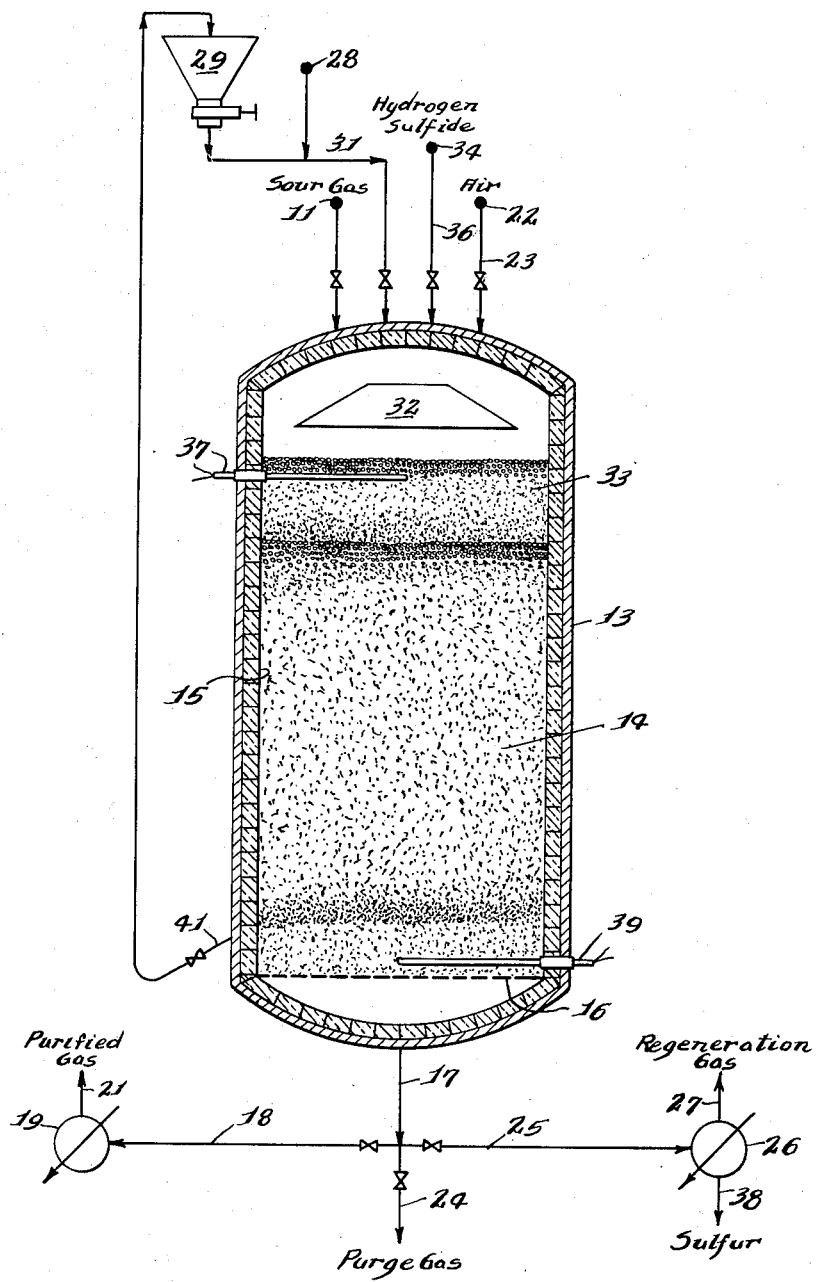

REGENERATION OF HYDROGEN SULFIDE ABSORBENT AND MANUFACTURE OF SULFUR

Herbert N. Dunning, Bartlesville, Okla., and Arthur P. Lien, Highland, Ind., assignors to Standard Oil Company, Chicago, Ill., a corporation of Indiana Application November 27, 1953, Serial No. 394,804

10 Claims. (Cl. 23—3)

This invention relates to a method for the regeneration of hydrogen sulfide absorbents. More particularly it relates to a method for the regeneration of hydrogen sulfide absorbents whereby free sulfur is produced during said regeneration.

The removal of hydrogen sulfide from gaseous streams, such as gaseous hydrocarbons, hydrogen, water gas etc., is a serious industrial problem. The presence of hydrogen sulfide in such streams is objectionable from the standpoint of odor or corrosion. In addition, it may render said streams unsuitable for further industrial processing to more valuable products. If gaseous hydrocarbons containing hydrogen sulfide are employed as fuel, the noxious and corrosive sulfur dioxide is formed as a product which contributes to atmospheric pollution.

A number of techniques have been used to remove hydrogen sulfide from gaseous streams. One method is to pass the gaseous stream through a bed of alkaline absorbent material such as soda lime which functions to absorb the hydrogen sulfide. When the absorbent is no longer capable of absorbing hydrogen sulfide it is discarded since no known practical method for regenerating the alkaline absorbent material is available.

Due to shortages of sulfur, hydrogen sulfide has become important as a source material for its manufacture. Commercial methods employ absorbents such as alkanolamine or alkaline phosphate solutions to remove hydrogen sulfide from gaseous feed streams such as natural gas and then spring the hydrogen sulfide from the absorbent solution. The concentrated hydrogen sulfide is then converted to sulfur via the Claus process in converters containing bauxite catalyst. It is readily apparent that the use of a single material which functions both as an absorbent for the removal of hydrogen sulfide from gaseous streams and as a catalyst for the oxidation of the absorbed hydrogen sulfide to sulfur would be a desirable improvement over present methods for the manufacture of sulfur.

An object of this invention is a method of regenerating hydrogen sulfide absorbents. Another object of this invention is the manufacture of sulfur during the regeneration of hydrogen sulfide absorbents. A further object of this invention is a process for the removal of hydrogen sulfide from gaseous streams and the conversion of said hydrogen sulfide to sulfur. Other objects will become apparent in the course of the detailed description of the invention.

In accordance with this invention a gaseous stream containing hydrogen sulfide, but which is preferably free of carbon dioxide, is contacted with an absorbent such as soda lime under conditions for effecting absorption of the hydrogen sulfide until the absorbent becomes at least partially spent, after which the spent absorbent is regenerated by a technique employing an initiating step for the regeneration process. To initiate the regeneration of the absorbent, a portion of the absorbent adjacent the gas inlet is heated to a temperature in the range of about 1600 to 1800° F. and an oxidizing gas such as oxygen (air) or sulfur dioxide is passed therethrough under defined conditions to effect combustion of the absorbed hydrogen sulfide. This combustion is highly exothermic and a zone of incandescent heat (about 1600 to 1800° F.) proceeds through the spent absorbent mass leaving behind substantially regenerated absorbent. Specifically, it has been found that the regeneration of such absorbents may be initiated by passing a hydrogen sulfide stream and an oxidizing gas therefor through specific absorbents such as soda lime in their active state (fresh or regenerated) which function as combustion initiators and which are in contact with the mass of spent absorbent. An incandescent zone of intense heat is developed at the point of contact of the gases with the combustion initiator, at which time the passage of the hydrogen sulfide stream is discontinued while continuing and/or increasing the flow of the oxidizing gas through the spent absorbent mass. The incandescent glowing zone then moves from the combustion initiator into and through the spent absorbent mass to effect substantially complete regeneration thereof. The hydrogen sulfide stream employed in the initiating step must not be unduly dilute, but should contain more than 15% and preferably at least about 50% or more of hydrogen sulfide. The oxidizing stream should likewise be sufficiently concentrated in oxygen or sulfur dioxide to produce incandescent heat when reacted with the hydrogen sulfide on the surface of the combustion initiator. Pure oxygen should not be employed because of explosion hazards. Air is the preferred oxidizing gas. Atmospheric pressure may be employed in the initiation step and thereafter until the desired regeneration is effected, but superatmospheric presure, about 10 to 100 p. s. i. g. or more, is advantageous. The hydrogen sulfide stream and the oxidizing gas may be introduced at ordinary temperatures. The incoming gas temperature is not critical since incandescent heat is developed in the initiating step. The oxidizing stream may be passed through the absorbent at a rate of about 300 to 30,000, preferably about 1000 volumes of gas/hr./volume of absorbent.

While the absorbent is preferably soda lime, the invention is not limited thereto since other alkaline earth absorbents such as the alkaline earth metal oxides, hydroxides, and mixtures thereof may be employed alone or in admixture with alkali metal hydroxides. Thus magnesium, calcium, strontium, or barium oxides or hydroxides may be used alone or in natural or synthetic mixtures in any proportion; and alkali metal hydroxides such as lithium, sodium, or potassium hydroxide or their mixtures may be employed therewith in amounts of about 1 to 90% by weight of the mixture, although amounts in the range of about 2 to 15% by weight based on total mixture are preferred. The outstanding absorbent is soda lime which is prepared by slaking quick lime (calcium oxide) with aqueous caustic soda (sodium hydroxide) and drying the resultant product. These absorbents are well known to those skilled in the art and require no further description. The presence of a small amount of water, about 2%, within the absorbent is desirable since it catalyzes the reaction of the hydrogen sulfide with the absorbent.

The gaseous streams from which hydrogen sulfide may be removed are those such as sour natural gas, sour refinery gas, hydrogen streams containing hydrogen sulfide, etc. The gaseous stream may contain hydrogen sulfide in amounts from about 0.5% by volume and upward. Preferably the gaseous stream is relatively free of acidic impurities such as carbon dioxide since the latter will be absorbed and will thus lower the amount of hydrogen sulfide capable of being absorbed. Carbon dioxide reacts with the alkaline earth metal oxide or hydroxide to form the rather stable alkaline earth metal carbonate, e. g. calcium carbonate. Formation of the carbonate does not render the absorbent non-regenerable because the intense heat produced during the regeneration decomposes the carbonates to release carbon dioxide and regenerate the absorbent. The gaseous stream is passed through the mass of absorbent until the absorbent becomes at least partially spent, i. e. until the absorbent contains at least about 20% of the theoretical amount of hydrogen sulfide necessary to form the sulfide derivative of the absorbent. However, it is preferred to pass the gaseous stream containing hydrogen sulfide through the mass of absorbent until it is substantially spent for the removal of further amounts of hydrogen sulfide. Since the rate of absorption of hydrogen sulfide proceeds more rapidly at elevated temperatures, it is preferred to contact the gaseous stream with the absorbent at a temperature of at least about 200° F.

The combustion initiator is preferably an active, i. e. fresh or regenerated, soda lime. Other initiators may be prepared by intimately mixing sodium hydroxide or potassium hydroxide with an alkaline earth metal oxide or hydroxide or mixture thereof. The initiators contain about 2 to 90%, usually not more than 50%, and preferably about 2 to 15% of sodium hydroxide or potassium hydroxide by weight based on total mixture, with the remainder consisting essentially of the alkaline earth metal oxide, hydroxide, or mixtures thereof. The combustion initiators, described in detail supra, function to catalyze the reaction of hydrogen sulfide with the oxidizing gas. If alkali metal hydroxide alone, alkaline earth metal oxide or hydroxide alone, or alkaline earth metal oxide or hydroxide in admixture with lithium hydroxide is employed as the combustion initiator, such do not function to catalyze the reaction of hydrogen sulfide with air at atmospheric temperatures to produce sulfur and intense heat. Similarly, mixtures of potassium and magnesium carbonates, as well as mixtures of potassium carbonate and calcium oxide were found to be ineffective for catalyzing the reaction of hydrogen sulfide and oxidizing gas at room temperature to produce the intense exothermic reaction which is effected in the presence of the class of combustion initiators described supra.

The amount of combustion initiator should be large enough to build up the required temperature of at least about 1500 to 1600° F. when the hydrogen sulfide and oxidizing gases are initially passed therethrough. In practical application, this usually means a thin layer of at least about one-half to two inches in depth or more. The initiator should cover a substantial portion of that part of the spent absorbent which is the first portion of the absorbent contacted with the regenerating gases. It should cover a sufficient portion, and preferably substantially all of the surface of the spent absorbnet through which the hydrogen sulfide and oxidizing gas is first passed, so that when the introduction of hydrogen sulfide is discontinued and the introduction of oxidizing gas is continued the incandescent zone of 1600–1800° F. which had been formed and maintained in the combustion initiator will pass from the layer of initiator into the spent absorbent and continue therethrough as the combustion of the absorbed hydrogen sulfide contained in the spent absorbent proceeds.

The hydrogen sulfide-containing gas which is introduced into the layer of combustion initiator should contain at least about 15% by volume of hydrogen sulfide. Preferably, it should contain about 50% by volume or more, and cylinder hydrogen sulfide of the commercial variety may conveniently be employed. The oxidizing gas is a gas containing oxygen such as air, or sulfur dioxide. Air is preferred. These gases which serve to initiate the regeneration of the spent absorbent are introduced into the layer of combustion initiator at space velocities of between about 500 to about 30,000 volumes/hr./volume of initiator, preferably at a space velocity of about 1000 volumes of gas/hr./volume of initiator. The gases are introduced at atmospheric temperatures and the initiator catalyzes the exothermic reaction of hydrogen sulfide and oxidizing gas to form a zone of incandescent heat.

A wide range of ratios of hydrogen sulfide to oxidizing gas may be employed so long as the intense heat is produced, but it is preferred to employ approximately the ratio stoichiometrically necessary for the production of sulfur from the hydrogen sulfide. The hydrogen sulfide and oxidizing gas are introduced for the time necessary to cause the development of the zone of incandescent heat at which time the introduction of the hydrogen sulfide gas is discontinued and the introduction of the oxidizing gas is continued or increased. Unless the introduction of hydrogen sulfide is discontinued, the combustion zone will not progress through the spent absorbent and regeneration of the spent absorbent will not be effected. The oxidizing gas continues to be introduced into the spent absorbent until the zone of incandescent heat passes through the mass of spent absorbent. The sulfur vapors contained in the effluent regeneration gas are recovered by conventional means, ordinarily by cooling said gas to about 300° F.

The accompanying drawing which forms a part of the specification is a schematic flow diagram of a commercial system for desulfurizing a gaseous stream and subsequently regenerating the absorbent. The feed to this embodiment is a sour refinery gas which contains about 2% by volume of hydrogen sulfide, about 40% by volume of olefin hydrocarbons, mainly propylene, trace amounts of hydrogen, carbon monoxide, carbon dioxide, and the remainder paraffinic hydrocarbons, primarily propane. The sour refinery gas is passed from source 11 through valved line 12 into vessel 13. Vessel 13 is lined with fire brick 15 or similar material capable of withstanding the high temperatures encountered during the regeneration of the absorbent. Commercially purchased soda lime 14, herein employed as the absorbent, is contained within vessel 13. Grid 16, supporting the soda lime absorbent, is disposed within vessel 13 near its base. A free space exists within the top portion of vessel 13. The sour gas may be passed through the bed of soda lime at a space velocity ranging between about 1000 and 100,000 volumes of gas/hr./volume of soda lime; herein a space velocity of about 20,000 volumes of gas/hr./volume of soda lime is employed. The purified gas is withdrawn from vessel 13 by way of line 17 and passes through valved line 18 to cooler 19, wherein any heat which has been removed by the gases from the soda lime is removed from the purified gas. Purified gas is withdrawn from cooler 19 by way of line 21 and sent to further processing such as catalytic polymerization to produce gasoline etc. The sour gas is passed through the bed of soda lime 14 until the soda lime is substantially spent for the removal of further amounts of hydrogen sulfide, i. e. until such time as small amounts of hydrogen sulfide are detected in the purified gas.

After the soda lime absorbent has become substantially spent for the removal of further amounts of hydrogen sulfide, the passage of sour gas into vessel 13 is discontinued. Any hydrocarbons contained within the spent soda lime are removed by purging with an inert gas such as nitrogen, air etc., preferably containing a small amount of steam. The purge gas herein employed consists of air which is passed from source 22 by way of valved line 23 into vessel 13. The purge gas passes through the spent soda lime and is removed from vessel 13 by way of line 17 and is vented to the atmosphere by way of valved line 24; or if desired, the purge gas may be passed by way of valved line 25 to cooler 26 wherein some of the heat contained in the gas is extracted therefrom and the cooled purge gas then is vented to the atmosphere by way of line 27. Fresh soda lime from source 28 and regenerated soda lime from hopper 29 are passed by way of valved line 31 into vessel 13 and over distributor 32 whereby the active soda lime which is to function as the catalytic combustion initiator for the regeneration of the spent soda lime is spread in an approximately even layer 33 of about two inches in depth over substantially the entire surface of the spent soda lime. Commercial grade hydrogen sulfide from source 34 is passed by way of valved line 36 into vessel 13. Air from source 22 is passed by way of valved line 23 into vessel 13. These gases are introduced into vessel 13 at about room temperature in a ratio of approximately 2½ volumes of air per volume of hydrogen sulfide and until a temperature of about 1650° F. is developed within the combustion initiator layer 33. The gases are introduced at a space velocity of about 1000 volumes gas/hr./volume of initiator. Thermocouple 37 is used to measure the temperature in initiator layer 33. The gaseous reaction products containing vapors of sulfur, formed by the oxidation of the hydrogen sulfide, are removed from vessel 13 by way of line 17 and passed by way of valved line 25 into cooler 26 which is operated at about 300° F. to condense the sulfur produced. Molten sulfur is withdrawn from cooler 26 by way of line 38 and is sent to storage. The remaining gases, consisting essentially of nitrogen, are removed from cooler 26 by way of valved line 27 and vented as waste gas.

After a temperature of about 1650° F. has been developed within initiator layer 33, as determined by thermocouple 37, the introduction of hydrogen sulfide into vessel 13 is discontinued. The passage of air is increased into vessel 13 to a space velocity of about 1000 volume air/hr./volume of soda lime and the regeneration of the spent soda lime proceeds down through the bed of spent soda lime absorbent. Regeneration of the spent soda lime is completed when the zone of incandescent heat reaches the base of soda lime bed 14. Termination of the regeneration is indicated by an increase in temperature at the base of the bed of soda lime to about 1600° F. followed by a relatively rapid drop in temperature at the base of the soda lime as determined by thermocouple 39 or other suitable means.

The effluent regeneration gases containing vapors of sulfur and water, carbon dioxide and nitrogen etc., are removed from vessel 13 by way of line 17 and then passed by way of valved line 25 into cooler 26 where the sulfur vapors are condensed. Molten sulfur is withdrawn by way of line 38 from cooler 26 and sent to storage. The remaining regeneration gases which consist essentially of nitrogen are withdrawn from cooler 26 by way of valved line 27 and vented to the atmosphere as waste gas. If desired, the regeneration gases may advantageously be employed as the purge gas. After the soda lime has thus been regenerated, the passage of air is continued in order to cool the regenerated soda lime to about 700° F. or lower, to prepare it for the absorption cycle to follow. A small amount of steam or water may be introduced with the air at this time to activate the soda lime for the absorption cycle. Regenerated soda lime is withdrawn at a point near the bottom of soda lime bed 14 through valved line 41 until the level of the soda lime within vessel 13 is approximately the same as existed prior to the introduction of the layer of initiator. This regenerated soda lime is conveyed to hopper 29 from which it is subsequently introduced as all or a portion of the combustion initiator for the regeneration of the spent soda lime.

In order to show the results obtainable by the process of this invention, certain illustrative experimental data are presented.

*Run I*

A sample of commercially purchased soda lime saturated with hydrogen sulfide was prepared for Runs I, II, and III. A Pyrex glass tube (in certain other runs a metal tube was employed) of about 20 ml. diameter was packed with a portion of the hydrogen sulfide-saturated soda lime to a depth of about six inches. Fresh soda lime was then packed into the tube adjacent to the hydrogen sulfide-saturated soda lime, and to a depth of about one-half inch. Commercial cylinder hydrogen sulfide and air were introduced at room temperature into the reactor and passed first through the layer of fresh soda lime and then through the hydrogen sulfide-saturated soda lime, thereafter exiting from the opposite end of the tube. After a short time a zone of incandescent heat developed within the fresh soda lime. The flow of hydrogen sulfide was shut off, and the flow of air was continued. The incandescent zone traveled from the fresh soda lime through the spent soda lime until the end of the spent soda lime was reached, whereupon the glow was extinguished. Clouds of sulfur and steam were produced. The regenerated soda lime was analyzed as containing at least about 44% of calcium oxide and sodium hydroxide. Some calcium sulfate and sodium sulfate were found together with minor amounts of sodium sulfide and calcium sulfide.

*Run II*

Another portion of the sample of hydrogen sulfide-saturated soda lime was packed within a Pyrex glass tube, and fresh soda lime packed adjacent the hydrogen sulfide-saturated soda lime, in the same manner as was described in the preceeding experiment. Commercial cylinder hydrogen sulfide and air at room temperature were introduced into the tube, passing first through the fresh soda lime and then through the hydrogen sulfide-saturated soda lime. In a short time a zone of incandescent heat developed within the layer of fresh soda lime. The incandescent glow continued so long as the hydrogen sulfide and air continued to be introduced into the fresh soda lime. This experiment indicates the necessity for discontinuing the flow of hydrogen sulfide and continuing the passage of oxidizing agent, once the incandescent zone has developed, in order to regenerate the spent soda lime.

*Run III*

The remaining portion of the hydrogen sulfide-saturated soda lime was packed in a Pyrex glass tube of about 20 ml. diameter to a depth of about six inches. Commercial cylinder hydrogen sulfide and air were introduced into the hydrogen sulfide-saturated soda lime. No reaction occurred. This indicates that unless fresh soda lime is packed in the forepart of the reactor prior to introduction of hydrogen sulfide and air, the hydrogen sulfide-saturated absorbent can not be regenerated.

To determine whether soda lime containing absorbed hydrogen sulfide could be regenerated by conventional techniques such as blowing with air or mixtures of air and steam at elevated temperatures, a number of experiments were performed. These experiments demonstrated that at best only a very minor regeneration of the soda lime absorbent could be obtained. The following experiments were typical.

*Run IV*

A reactor packed with 60 ml. of glass beads, 5.087 gms. of commercially purchased soda lime, and 20 ml. of glass beads arranged in that order, was employed. The soda lime had been essentially saturated with hydrogen sulfide in previous experiments. The reactor was maintained at about 400° F. and commercial cylinder hydrogen sulfide was pressured into the reactor until a pressure of 29.6 p. s. i. g. was reached therein. The pressure dropped to 26.2 p. s. i. g. after two minutes and remained essentially constant thereafter, indicating no further absorption of hydrogen sulfide, i. e. the soda lime was saturated with hydrogen sulfide under these conditions. The hydrogen sulfide pressure in the reactor was released and an attempt was made to regenerate soda lime. The temperature of the reactor was increased to 660° F. and air was blown therethrough at 12 p. s. i. g. for three hours. To determine whether any regeneration of the soda lime had been accomplished, the reactor was evacuated to 0.5 ml. of mercury to remove any air contained therein and hydrogen sulfide was pressured into the reactor until a pressure of 29.5 p. s. i. g. was reached therein. The reactor was maintained at 660° F. during this pressuring operation. The pressure dropped to 26.3 p. s. i. g. after four minutes and remained essentially constant thereafter. This slight drop in pressure indicates only a very small amount of hydrogen sulfide was absorbed and that consequently only a very minor partial regeneration of the soda lime had been effected, i. e. about a 3% regeneration, by a conventional technique of blowing the hydrogen sulfide-saturated soda lime with air at an elevated temperature.

*Run V*

The reactor containing soda lime saturated with hydrogen sulfide from preceeding Run IV was employed in an experiment to determine the effectiveness of mixtures of air with steam for the regeneration of the hydrogen sulfide-saturated soda lime. The mixture of air and steam were passed through the soda lime for one-half hour. During this time the reactor was maintained at 660° F. To determine the effectiveness of this method of regeneration, the reactor was evacuated to 0.5 ml. of mercury to remove any air or steam contained therein, and hydrogen sulfide was then pressured into the reactor until a pressure of 29.1 p. s. i. g. was reached therein. The reactor was maintained at 660° F. during the repressuring. After about five minutes the pressure had dropped to about 26.0 p. s. i. g. and remained essentially constant thereafter. This small drop in pressure indicates that only a small amount of hydrogen sulfide was absorbed and consequently only a minor regeneration of the hydrogen sulfide-saturated soda lime had been effected by blowing with a mixture of air and steam, i. e. about a 3% regeneration of the soda lime occurred.

Having thus described the invention what is claimed is:

1. A method of regenerating an alkaline earth absorbent material which has become at least partially spent by absorbing hydrogen sulfide from a gaseous stream, which comprises forming on a substantial portion of the surface of said spent absorbent a thin layer of a combustion initiator consisting essentially of an intimate mixture of at least one alkali metal hydroxide selected from the class consisting of sodium hydroxide and potassium hydroxide with at least one member selected from the class consisting of alkaline earth metal oxides and hydroxides, introducing concurrently a hydrogen sulfide-containing gas and an oxidizing gas therefor selected from the class consisting of air and sulfur dioxide into said combustion initiator layer in amounts at least about sufficient to cause a high temperature zone of about 1600 to 1800° F. to develop within said initiator layer, discontinuing the introduction of said hydrogen sulfide-containing gas, and continuing the introduction of said oxidizing gas through said initiator layer and then through said spent absorbent whereby said high-temperature zone traverses said spent absorbent and effects regeneration thereof.

2. The process of claim 1 wherein said absorbent consists essentially of soda lime.

3. The process of claim 1 wherein said combustion initiator consists essentially of an intimate mixture of potassium hydroxide and magnesium oxide.

4. The process of claim 1 wherein said combustion initiator consists essentially of an intimate mixture of sodium hydroxide and calcium oxide.

5. The process of claim 1 wherein said combustion initiator consists essentially of soda lime.

6. The process of claim 1 wherein said hydrogen sulfide-containing gas and said oxidizing gas are introduced in approximately the stoichiometric ratio necessary to produce sulfur.

7. A method of regenerating soda lime absorbent which has become substantially spent by absorbing hydrogen sulfide from a gaseous stream, which comprises forming a thin layer of at least about one-half inch in depth of a combustion initiator consisting essentially of soda lime in its active state, said layer of initiator substantially covering the surface of the spent soda lime which is first contacted with the gases hereinafter defined, introducing concurrently a hydrogen sulfide-rich gas and air into said combustion initiator layer in amounts at least about sufficient to cause a high temperature zone of about 1600 to 1800° F. to develop within said initiator layer, discontinuing the introduction of said hydrogen sulfide-rich gas, continuing the introduction of said air through said initiator and then through said spent absorbent whereby said high-temperature zone traverses said spent absorbent and effects regeneration thereof, and recovering sulfur produced.

8. A process which comprises contacting a gaseous stream containing hydrogen sulfide with a hydrogen sulfide absorbent consisting essentially of an intimate mixture of at least one alkali metal hydroxide selected from the class consisting of sodium hydroxide and potassium hydroxide with at least one member selected from the class consisting of alkaline earth metal oxides and hydroxides until said absorbent becomes at least partially spent; forming on a substantial portion of the surface of said spent absorbent, a thin layer of a combustion initiator consisting essentially of absorbent in its active state, at least a portion of said initiator consisting of regenerated absorbent; introducing concurrently a hydrogen sulfide-containing gas and an oxidizing gas therefor selected from the class consisting of air and sulfur dioxide into said combustion initiator layer in amounts at least about sufficient to cause a high temperature zone of about 1600 to 1800° F. to develop within said initiator layer; discontinuing the introduction of said hydrogen sulfide-containing gas; and continuing the introduction of said oxidizing gas through said initiator layer and said spent absorbent whereby said high-temperature zone traverses said spent absorbent and effects regeneration thereof.

9. A cyclical process for the removal of hydrogen sulfide from a gaseous stream and the manufacture of sulfur therefrom which includes the steps of (1) passing a gaseous stream containing hydrogen sulfide through a mass of soda lime absorbent until said soda lime is about substantially spent for the removal of hydrogen sulfide, (2) forming a thin layer of at least about one-half inch in depth of a combustion initiator consisting essentially of soda lime in its active state, at least a portion of said initiator consisting of recycled regenerated soda lime, said initiator substantially covering the surface of the spent soda lime which is first contacted with the gases hereinafter defined, (3) introducing concurrently a hydrogen sulfide-rich gas and air into said combustion initiator layer in amounts at least about sufficient to cause a high temperature zone of about 1600 to 1800° F. to develop within said initiator layer, (4) discontinuing the introduction of said hydrogen sulfide-rich gas, (5) continuing the introduction of said air through said initiator layer and then through said spent soda lime whereby said high-temperature zone traverses said spent absorbent and effects regeneration thereof.

10. The process of claim 9 wherein said hydrogen sulfide and said air in step (3) are introduced in approximately the stoichiometric ratio necessary to produce sulfur, and wherein sulfur produced during the regeneration process is recovered.

References Cited in the file of this patent

UNITED STATES PATENTS

| | | |
|---|---|---|
| 632,400 | Chollar | Sept. 5, 1899 |
| 1,812,527 | Gross | June 30, 1931 |
| 1,822,293 | Joseph | Sept. 8, 1931 |
| 1,922,872 | Thompson | Aug. 15, 1933 |
| 2,551,905 | Robinson | May 8, 1951 |